United States Patent
Smolik et al.

(10) Patent No.: US 11,572,020 B2
(45) Date of Patent: Feb. 7, 2023

(54) PASSENGER COMPARTMENT STORAGE ASSEMBLY

(71) Applicant: Nissan North America, Inc., Franklin, TN (US)

(72) Inventors: David Smolik, Windsor (CA); Neil Francus, Plymouth, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 140 days.

(21) Appl. No.: 17/115,409

(22) Filed: Dec. 8, 2020

(65) Prior Publication Data
US 2022/0176882 A1 Jun. 9, 2022

(51) Int. Cl.
*B60R 7/04* (2006.01)
*B60R 11/00* (2006.01)

(52) U.S. Cl.
CPC ......... *B60R 7/04* (2013.01); *B60R 2011/0007* (2013.01)

(58) Field of Classification Search
CPC .......................... B60R 7/04; B60R 2011/0007
USPC ..................... 296/24.34, 37.8, 1.09
See application file for complete search history.

(56) References Cited

U.S. PATENT DOCUMENTS

| | | | | |
|---|---|---|---|---|
| 7,029,048 B1* | 4/2006 | Hicks | ..................... | B60N 3/101 296/193.04 |
| 9,016,749 B2* | 4/2015 | Mueller | ................... | B60R 5/006 296/37.14 |
| 9,481,310 B2* | 11/2016 | Chawlk | .................... | B60R 7/043 |
| 10,029,619 B2* | 7/2018 | Sahs | ......................... | B60R 7/04 |
| 2013/0038080 A1* | 2/2013 | Tate, Jr. | .................. | B60R 7/043 296/37.5 |
| 2014/0225403 A1* | 8/2014 | Shimada | ................... | B60N 2/06 297/188.1 |
| 2014/0367433 A1* | 12/2014 | Rifel | ...................... | B60N 3/105 220/237 |
| 2015/0217667 A1* | 8/2015 | Senda | ..................... | B60N 3/107 296/37.8 |
| 2015/0352993 A1* | 12/2015 | Bosma | ................... | B60N 3/103 224/544 |
| 2017/0136930 A1* | 5/2017 | Corse | ...................... | B60N 3/103 |
| 2017/0259749 A1* | 9/2017 | Okinaga | ................... | B60R 7/04 |
| 2020/0247323 A1* | 8/2020 | Smolik | .................. | B60N 2/793 |

* cited by examiner

*Primary Examiner* — D Glenn Dayoan
*Assistant Examiner* — E Turner Hicks
(74) *Attorney, Agent, or Firm* — Global IP Counselors, LLP (57) ABSTRACT

A passenger compartment storage assembly includes a storage structure, a first storage box and a box retaining structure. The storage structure is fixed to a floor of a passenger compartment of a vehicle and having a storage compartment defined therein. The first storage box has a predetermined overall shape. The box retaining structure is configured and dimensioned to releasably retain the first storage box. The storage compartment is dimensioned and configured to receive the first storage box and the box retaining structure within the storage compartment.

15 Claims, 12 Drawing Sheets

PASSENGER COMPARTMENT STORAGE ASSEMBLY

BACKGROUND

Field of the Invention

The present invention generally relates to a storage assembly within a passenger compartment of a vehicle. More specifically, the present invention relates to storage assembly that includes storage structure, such as a center console and/or a base portion of a seat assembly, that is dimensioned and configured to receive and conceal at least a storage box or a box retaining structure that retains one or more of storage boxes.

Background Information

There are many commercial vehicles that are designed to store and haul large toolboxes and/or building materials for use by a craftsman. Small tools and hardware are often stored in large boxes that stored within the vehicle in much the same way as large toolboxes, by placing them on the floor of a cargo area of the vehicle.

SUMMARY

One object of the present disclosure is to provide a storage assembly within a passenger compartment of a vehicle with a structure or structures that securely retain and store small tools and/or hardware in a convenient location.

In view of the state of the known technology, one aspect of the present disclosure is to provide a passenger compartment storage assembly with a storage structure, a first storage box and a box retaining structure. The storage structure is fixed to a floor of a passenger compartment of a vehicle and has a storage compartment defined therein. The first storage box has a predetermined overall shape. The box retaining structure is configured and dimensioned to releasably retain the first storage box. The storage compartment is dimensioned and configured to receive the first storage box and the box retaining structure within the storage compartment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
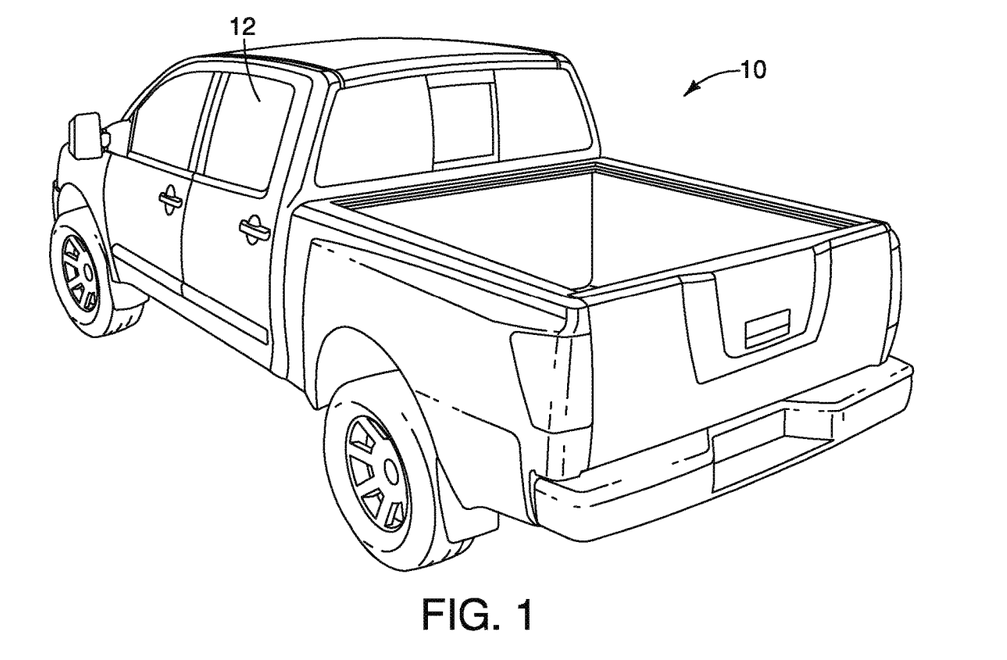
FIG. 1 is a rear perspective view of a vehicle that includes a storage assembly within its passenger compartment in accordance with a first embodiment.
Figure 2:
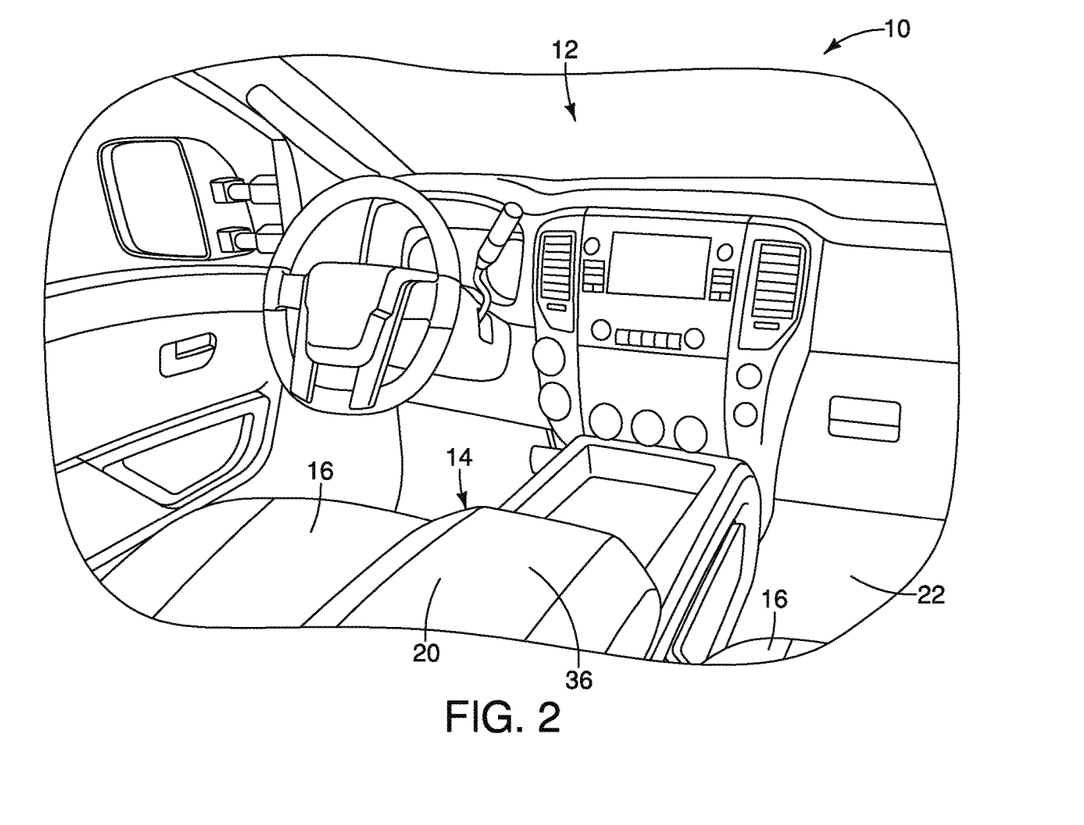
FIG. 2 is a perspective view of the passenger compartment of the vehicle showing a storage assembly between front seats in accordance with the first embodiment.

Referring initially to FIGS. 1 and 2, a vehicle 10 having a passenger compartment 12 with a storage assembly 14 is illustrated in accordance with a first embodiment. The storage assembly 14 is also referred to herein below as a passenger compartment storage assembly 14.

Figure 21:
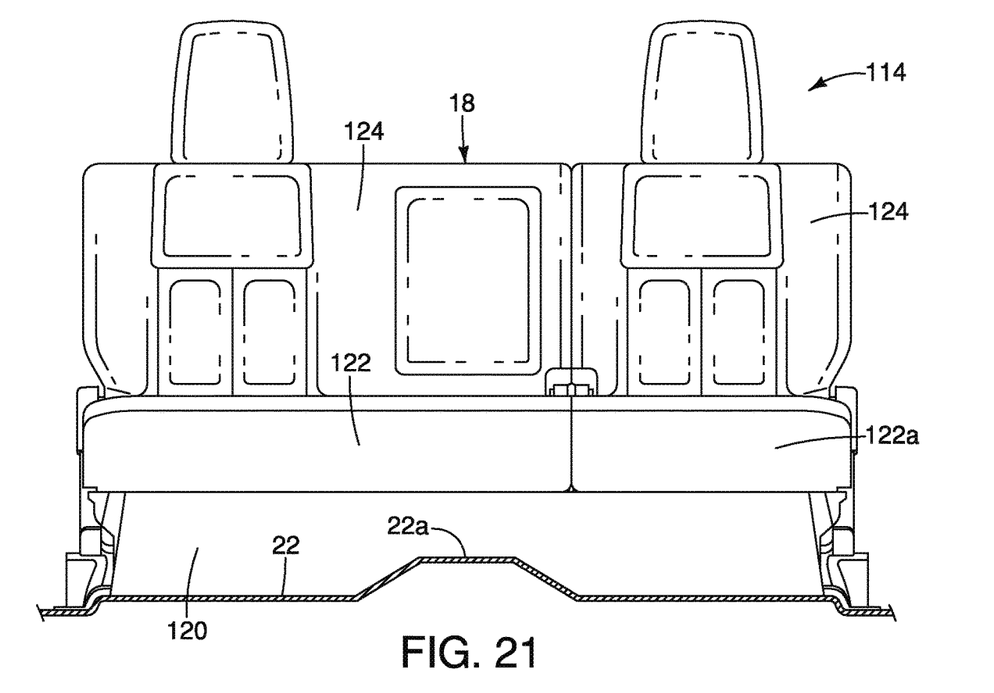
FIG. 21 is a front view of a rear seat assembly that includes a base portion, a seat cushion portion and a seat back portion, the base portion at least partially defining a storage assembly in accordance with a second embodiment.

In the depicted embodiment, the vehicle 10 is a pick-up truck that includes a front seats 16 (FIG. 2) and a rear seat assembly 18 (depicted in FIG. 21 which shows a second embodiment). However, any vehicle having a center console 20 can include the storage assembly 14 described below.

The passenger compartment 12 of the vehicle 10 is partially defined by a floor structure 22. The front seats 16, the rear seat assembly 18, and the center console 20 are fixed to the floor structure 22 via mechanical fasteners (not shown), or other mechanical means, in a conventional manner. The passenger compartment 12 includes many conventional features, structures and components. Since such conventional features, structures and components are well known, further description is omitted for the sake of brevity.

In the first embodiment, the storage assembly 14 includes the center console 20, a box retaining structure 24 and at least a first storage box 26.

Figure 3:
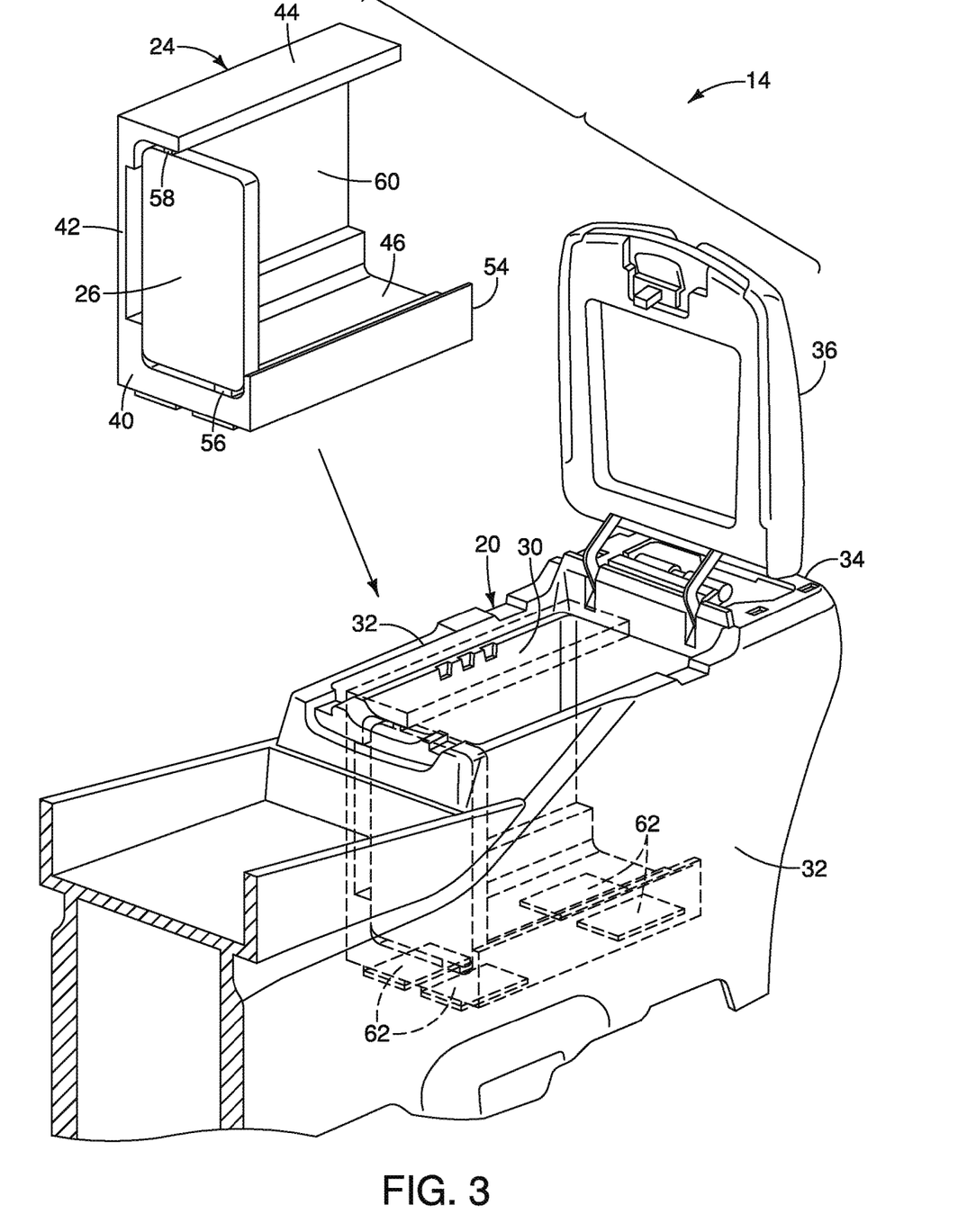
FIG. 3 is a perspective view of a storage structure, a box retaining structure and a first storage box of the storage assembly in accordance with the first embodiment.
Figure 4:
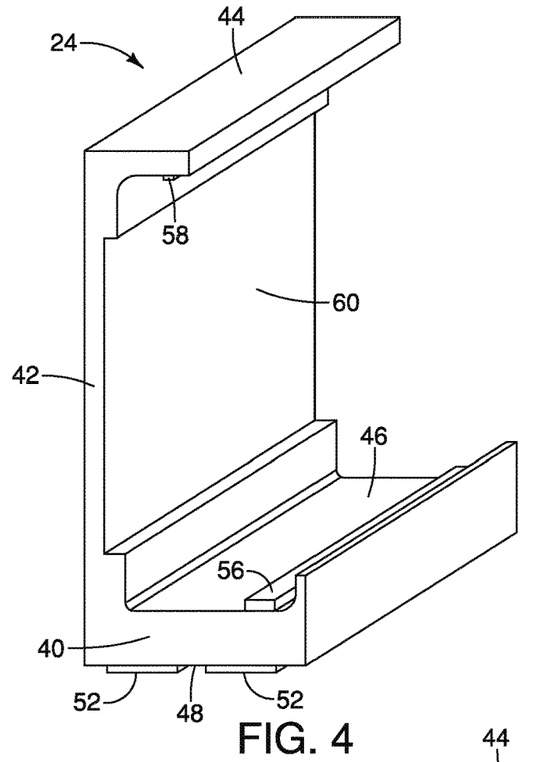
FIG. 4 is a perspective view of the box retaining structure shown removed from the storage assembly in accordance with the first embodiment.
Figure 5:
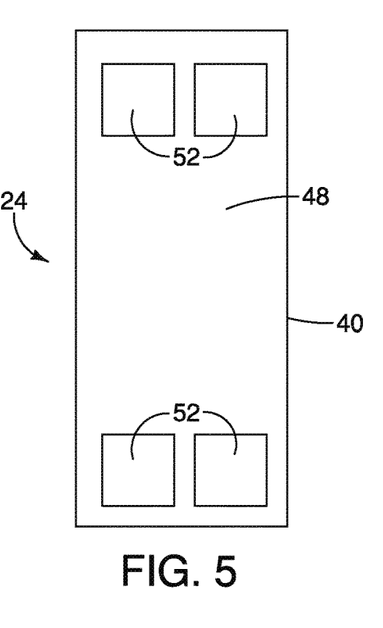
FIG. 5 is a bottom view of the box retaining structure showing alignment projections in accordance with the first embodiment.
Figure 6:
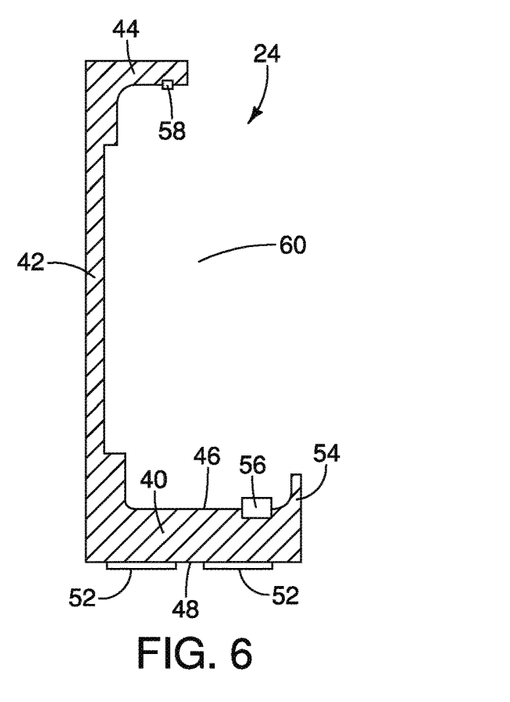
FIG. 6 is a cross sectional view of the box retaining structure showing the alignment projections, a first retaining strip and a second retaining strip in accordance with the first embodiment.
Figure 16:
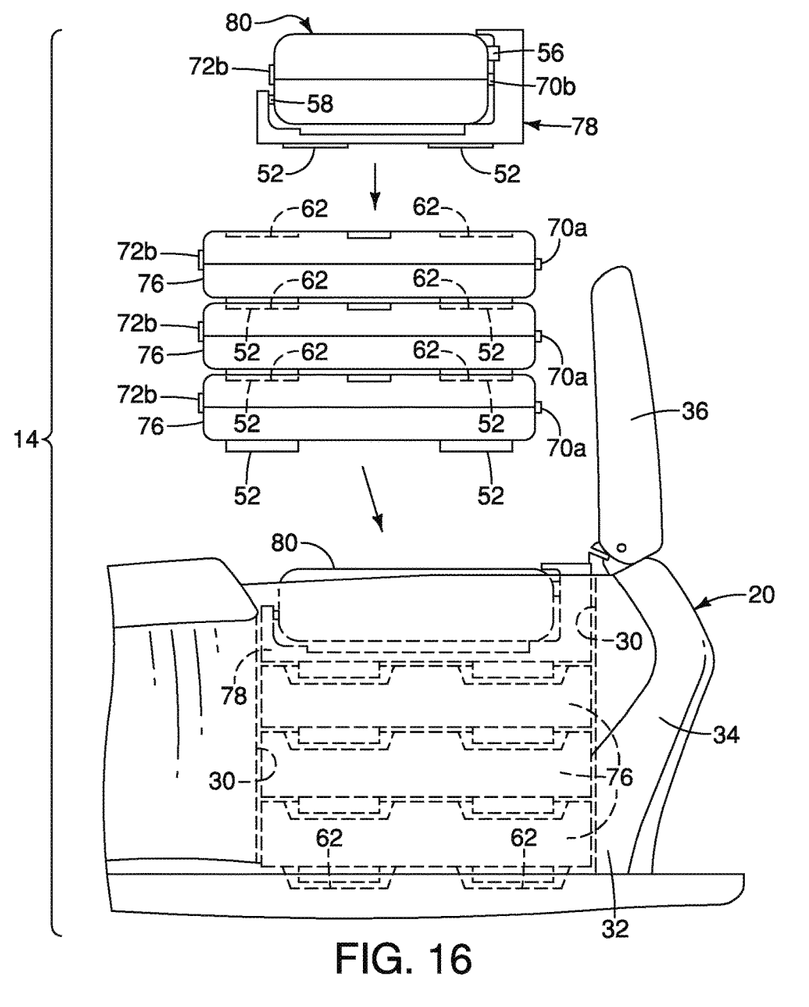
FIG. 16 is an exploded side view of the storage structure (a center console) with three of the third storage boxes along with the single box retaining structure and single storage box being stacked one on top of the other and inserted into the storage compartment of the storage structure in accordance with the first embodiment.
Figure 17:
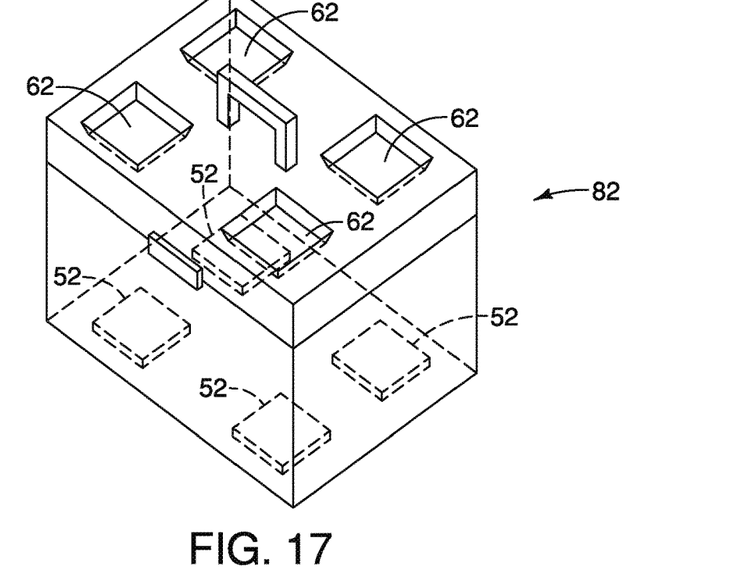
FIG. 17 is a perspective view of a storage container that is larger than any of the first second and third storage boxes in accordance with the first embodiment.
Figure 18:
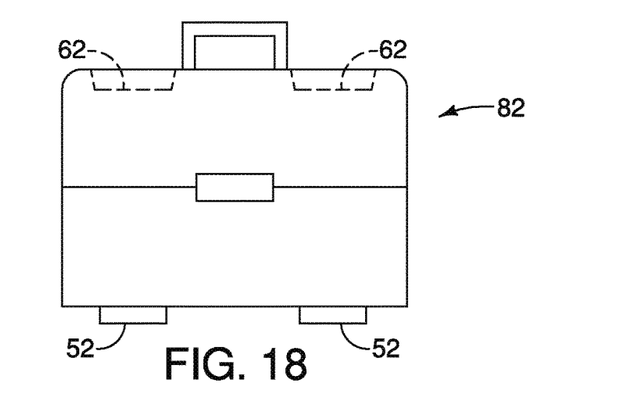
FIG. 18 is a side view of the storage container depicted in FIG. 17 in accordance with the first embodiment.
Figure 19:
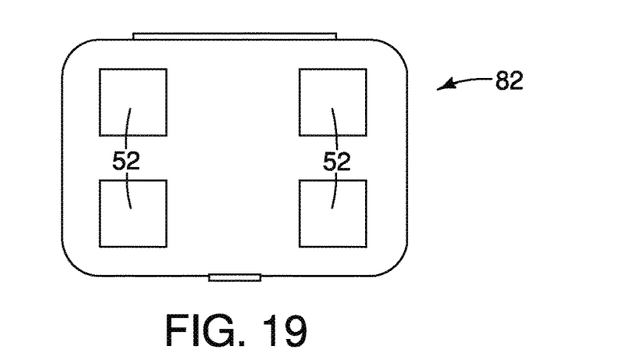
FIG. 19 is a bottom view of the storage container depicted in FIGS. 17 and 18 in accordance with the first embodiment.
Figure 20:
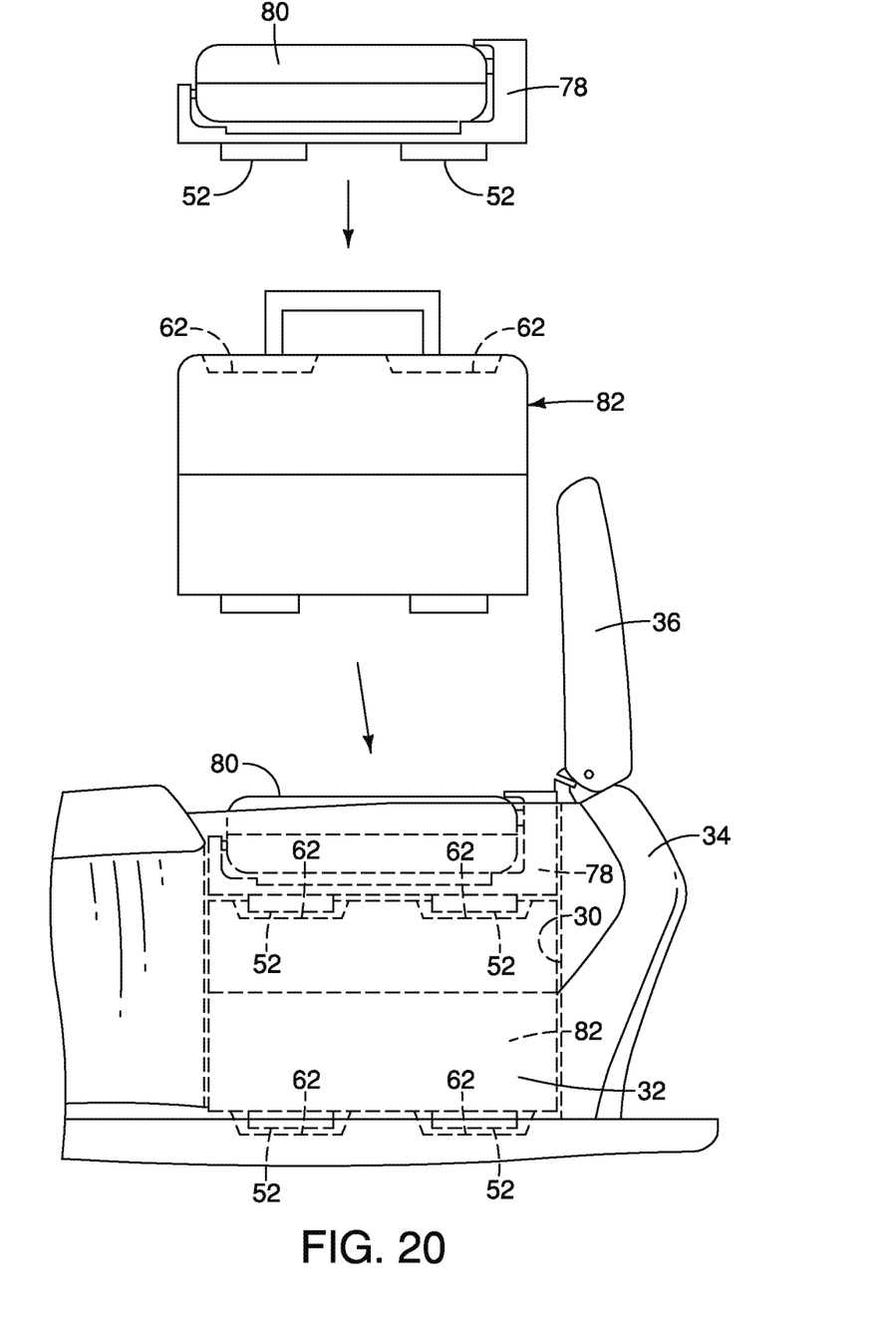
FIG. 20 is an exploded side view of the storage structure with the storage container, the single box retaining structure and single storage box being stacked one on top of the other and inserted into the storage compartment of the storage structure in accordance with the first embodiment.

The center console 20 is also referred to herein below as a storage structure 20 and has many conventional features including a storage compartment 30. More specifically, the center console 20 includes side walls 32 and a back wall 34 that at least partially define the storage compartment 30, as shown in FIGS. 3, 16 and 20. The center console 20 further includes a lid 36 that is attached to the back wall 34 for pivotal movement between a closed position (FIG. 2) and an open position (FIG. 3). The storage compartment 30 of the center console 20 is dimensioned and configured to receive the first storage box 26 and the box retaining structure 24, as described further below.

The box retaining structure 24 is configured and dimensioned to releasably retain the first storage box 26 therein and fit within the storage compartment 30 of the center console 20, as shown in FIG. 3. Put another way, the storage compartment 30 is dimensioned and shaped to receive the box retaining structure 24 such that the lid 36 can close, covering the box retaining structure 24 and the first storage box 26 (or multiples thereof). As shown in FIGS. 3-6 and 9-11, the box retaining structure 24 a base portion 40, a first upright portion 42 and an upper portion 44. The base portion 40 has an upper surface 46 and a bottom or lower surface 48. The lower surface 48 includes alignment projections 52 extending therefrom. In the depicted embodiment, there are four alignment projection 52. The base portion 40 also includes a second upright portion 54 that extends upward from a first side of the base portion 40. The first upright portion 42 extends upward from a second side (opposite the first side of the base portion 40 with the upper portion 44 extending laterally from an upper end of the first upright portion 42 above the base portion 40. The second upright portion 54 is parallel to the first upright portion 42.

Figure 9:
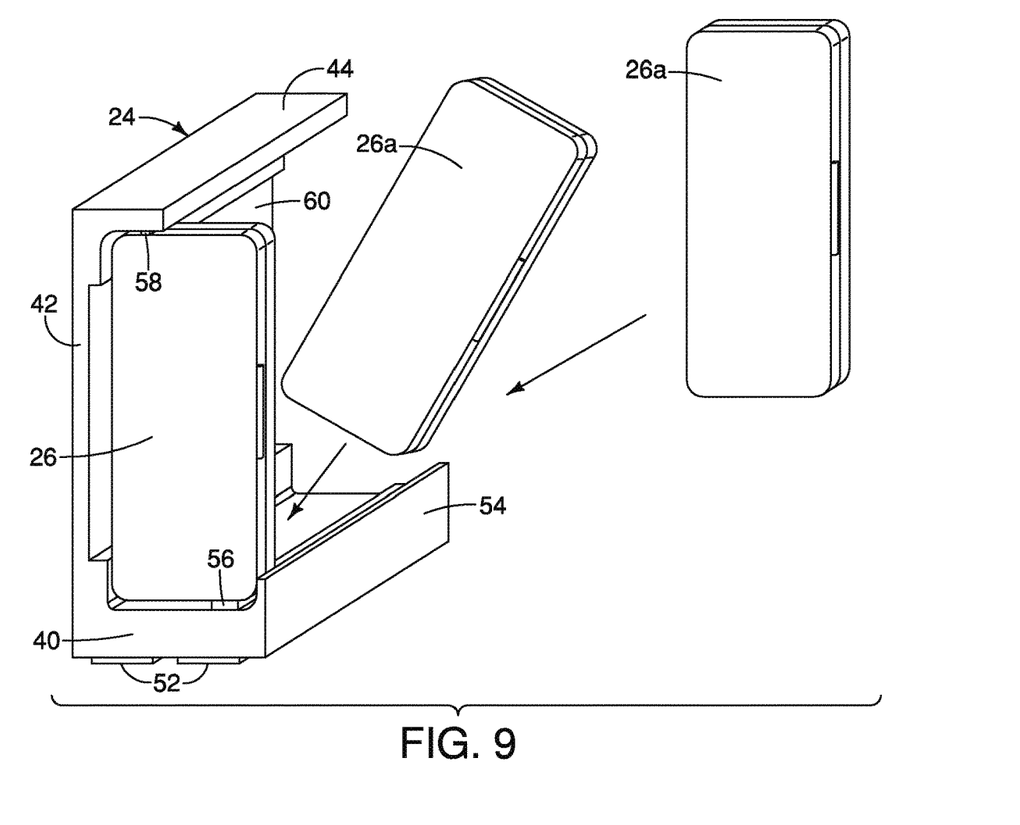
FIG. 9 is a perspective view of the box retaining structure with the first storage box inserted into and retained between the first and second retaining strips, along with second storage boxes being inserted into the box retaining structure, in accordance with the first embodiment.
Figure 10:
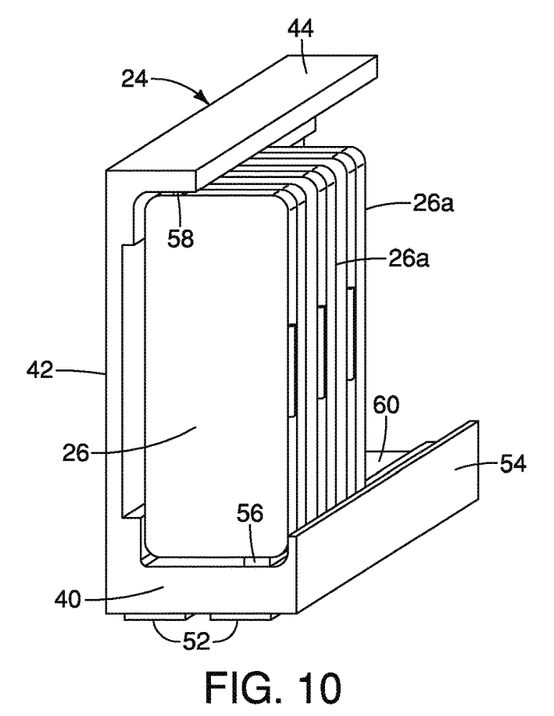
FIG. 10 is a perspective view of the box retaining structure with the first storage box and the second storage boxes retained within the box retaining structure, in accordance with the first embodiment.
Figure 11:
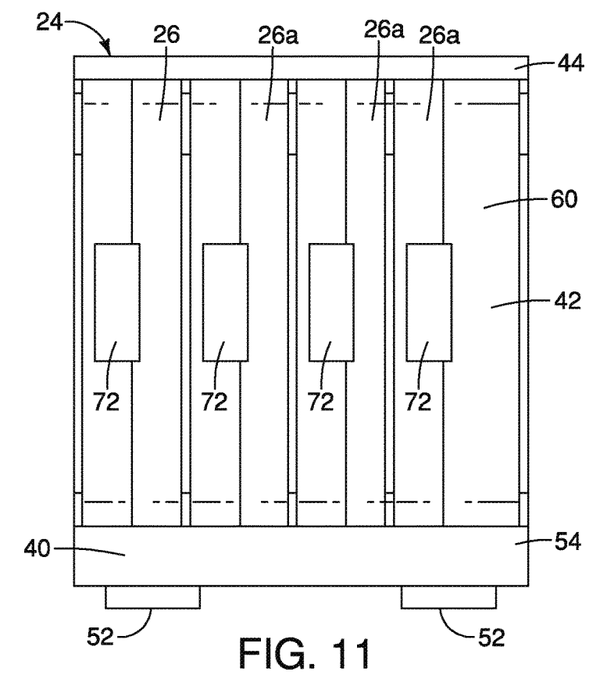
FIG. 11 is a side view of the box retaining structure with the first storage box and the second storage boxes retained within the box retaining structure, in accordance with the first embodiment.

The upper surface 46 of the base portion 40 includes a first retaining strip 56 (a flexible and resilient strip of material) that is installed within a slot formed along the upper surface 46 of the base portion 40. The first retaining strip 56 is made of a resilient foam-like material that can be elastically deformed in response to the first storage box 26 being pressed against it and applies a biasing force when compressed that retains the first storage box 26 within the box retaining structure 24, as described further below. A lower surface of the upper portion 44 includes a second retaining strip 58 installed within a slot that is basically the same as the first retaining strip 56 being a flexible and resilient strip of material. The first upright portion 42 and the second upright portion 54 define a large gap that provides access to an open area 60 therebetween such that the first storage box 26 or a plurality of second storage boxes 26a can be inserted and retained within the box retaining structure 24, as shown in FIGS. 9-11.

Hence, the base portion 40, the first upright portion 42 and the upper portion 44 are dimensioned and arranged such that the open area 60 is defined between the upper portion 44 and the base portion 40 backed by the first upright portion 42.

With the first storage box 26 and optionally one or more of the plurality of second storage boxes 26a retained in the box retaining structure 24, the box retaining structure 24 can be inserted into the storage compartment 30 of the center console 20 as shown in FIG. 3.

The bottom surface 48 of the base portion 40 of the box retaining structure 24 includes alignment projection 52

The storage compartment 30 of the center console 20 has a bottom surface that can included alignment areas 62 dimensioned and spaced apart from one another such that the alignment projections 52 fit into the alignment areas 62, as shown in FIG. 16.

Figure 7:
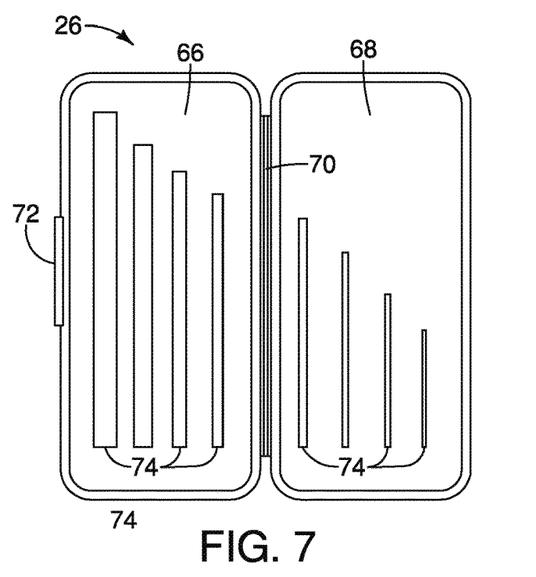
FIG. 7 is a plan view of the first storage box in an open orientation showing small tools, such as drill bits, in accordance with the first embodiment.
Figure 8:
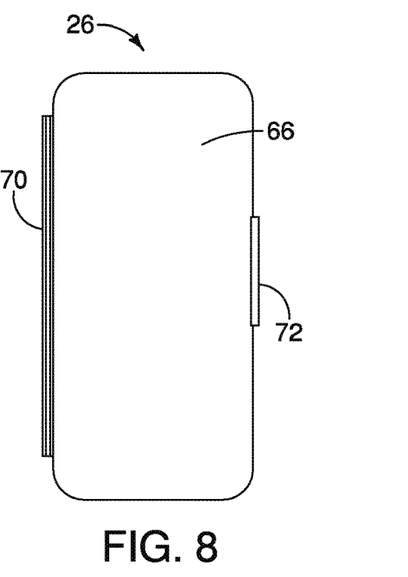
FIG. 8 is another plan view of the first storage box in a closed orientation showing a hinge and a latch structure, in accordance with the first embodiment.

As shown in FIGS. 7-9, the first storage box 26 includes a first part 66, a second part 68, a hinge 70 and a latch structure 72. The first part 66 and the second part 68 are connected to one another by the hinge 70 such that the first part 66 and the second part 68 can pivot about the hinge 70 between an open orientation shown in FIG. 7 and a closed orientation shown in FIGS. 8 and 9. The first part 66 and the second part 68 are configured to retain tools, such as, for example, drill bits 74, router bits or the like.

The second storage boxes 26a have a construction similar to the first storage box 26 but are configured internally to store differing sets of tools and/or hardware. As shown in FIGS. 10 and 11, the boxes 26a can have differing dimensions, so long as they are dimensioned to fit into the open area 60 of the box retaining structure 24.

The storage compartment 30 can be used to retain may different types of other boxes, in addition to the first storage box 26 and the second storage boxes 26a.

For example, as shown in FIGS. 12-20, various other types of boxes can be stored in the storage compartment 30, such as a third storage box 76, a single box retaining structure 78 with a single storage box 80 and a storage container 82.

Figure 12:
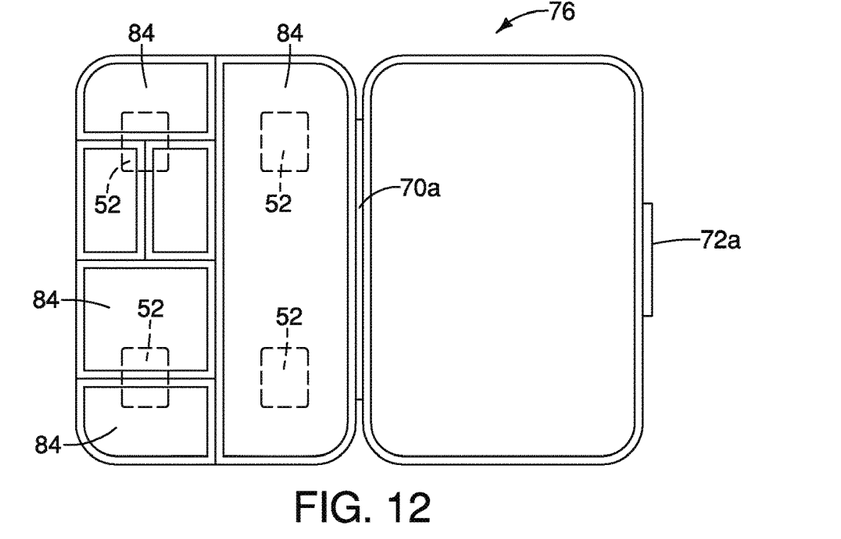
FIG. 12 is a plan view of a third storage box in an open orientation showing compartments for small hardware and/or small tools, in accordance with the first embodiment.
Figure 13:
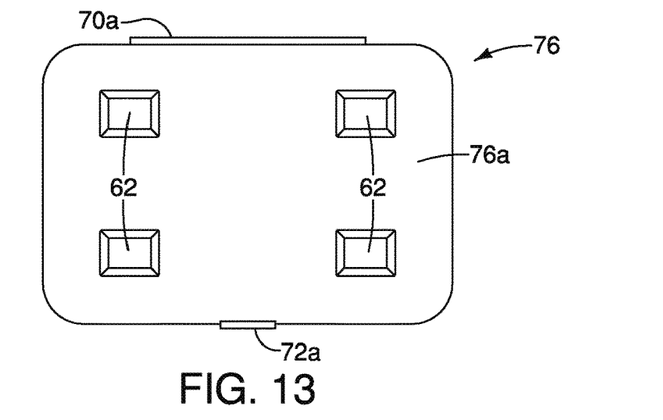
FIG. 13 is a top view of the third storage box showing alignment areas in accordance with the first embodiment.
Figure 14:
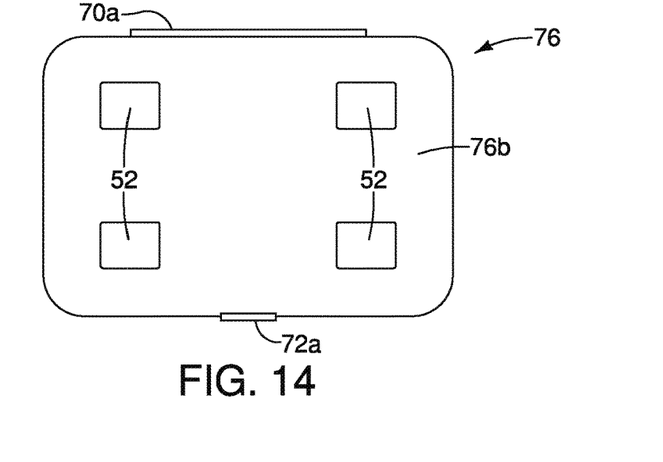
FIG. 14 is a bottom view of the third storage box showing alignment projections in accordance with the first embodiment.

The third storage box 76 shown in FIGS. 12-14 and 16 is configured to retain small tools and/or hardware. As shown in FIG. 12, the third storage box 76 has a first part with a plurality of partitions that define a plurality of bins 84 and a second part that serves as a lid. The first and second parts are connected to one another via a hinge 70a. The second part includes a latch structure 72a. An upper surface 76a includes a plurality of the alignment recesses 62 and a bottom surface 76b includes a plurality of the alignment projections 52 that fit into the alignment recesses 62 when a plurality of the third storage boxes 76 are stacked on top of one another, as shown in FIG. 16.

Figure 15:
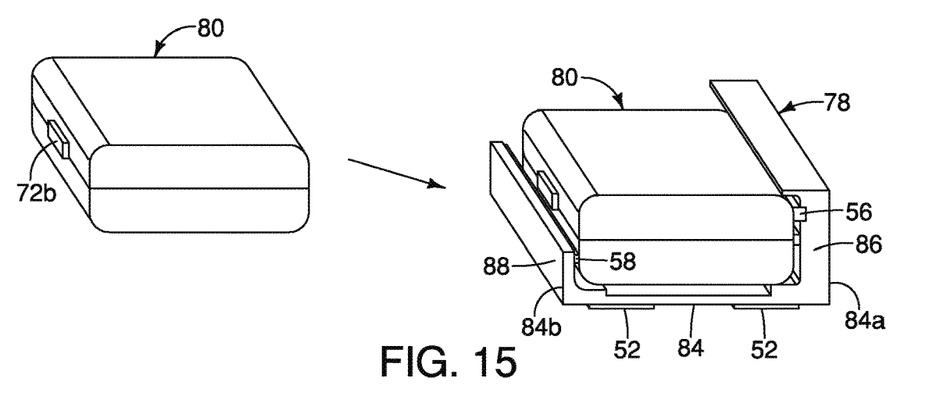
FIG. 15 is an exploded perspective view of a single box retaining structure and a single storage box, with the single storage box being inserted into the single box retaining structure in accordance with the first embodiment.

The single box retaining structure 78 is shown in FIGS. 15 and 16 along with the single storage box 80. The single box retaining structure 78 includes a base portion 84, a first upright portion 86 and a second upright portion 88. The base portion 84 has a first side 84a and a second side 84b with the first upright portion 86 extending upward from the first side 84a of the base portion 84, and the second upright portion 88 extending upward from the second side 84b of the base portion 84. The first upright portion 86 includes the first retaining strip 56 and the second upright portion 88 includes the second retaining strip 58. The single storage box 80 can be retained in the single box retaining structure 78 such that the single box retaining structure 78 and the single storage box 80 can be stored within the storage compartment 30 of the center console 20 as shown in FIG. 16.

The single storage box 80 is similar to the first storage box 26 in that it has two parts that are fixed to one another by a hinge 70b and are held shut by a latch 72b.

As shown in FIG. 16, a plurality of the third storage boxes 76 can be stacked atop one another and are aligned with one another to create a consistent stack due to the engagement between the alignment projections 52 and the alignment areas 62. The single box retaining structure 78 and the single storage box 80 can then be stacked on top of the topmost one of the third storage boxes 76.

It should be understood from the drawings and description herein that the single box retaining structure 78 and the single storage box 80 can be inserted first, second or third into the storage compartment 30 with one or more of the third storage boxes 76 stacked on top of the single box retaining structure 78 and the single storage box 80 within the storage compartment 30.

As shown in FIGS. 17-20, the storage container 82 is configured to store small tools, and/or hardware. The storage container 82 includes a hinge and a latch that are similar to the hinge 70 and the latch 72 of the first storage boxes 26. The storage container 82 has a predetermined overall shape such that the box retaining structure 78 with the storage box 80 retained therein and the storage container 80 can be inserted, retained and later removed from the storage compartment 30 of the center console 20 with one on top of the other, as shown in FIG. 20.

The storage container 82 includes an upper surface with alignment recesses 62 formed therein such that the alignment projections 52 of the box retaining structure 78 are aligned with and fit into the alignment recesses with the box retaining structure 78 resting atop the storage container 82.

In a second embodiment described below, another storage assembly 114 within a base portion 120 of the rear seat assembly 18 is described. Hence, as presented below, the another storage compartment 114 can be considered a second embodiment.

However, it should be understood from the drawings and the description herein, that the vehicle 10 can include both the storage assembly 14 within the center console 20, and can include the another storage compartment 114 within the base portion 120 of the storage assembly 114 as part of the first embodiment.

Alternatively, the storage assembly 14 and the another storage assembly 114 can be considered to be separate from one another with some vehicles having only the storage assembly 14, and other vehicle having only the another storage assembly 114.

Second Embodiment

Referring now to FIGS. 21-27, the rear seat assembly 18 that includes a storage assembly 114 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 22:
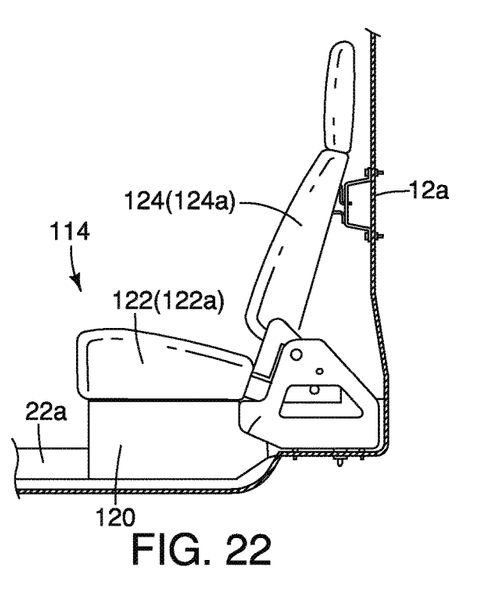
FIG. 22 is a side view the rear seat assembly with the seat cushion portion in a lowered or closed orientation covering the base portion in accordance with the second embodiment.
Figure 23:
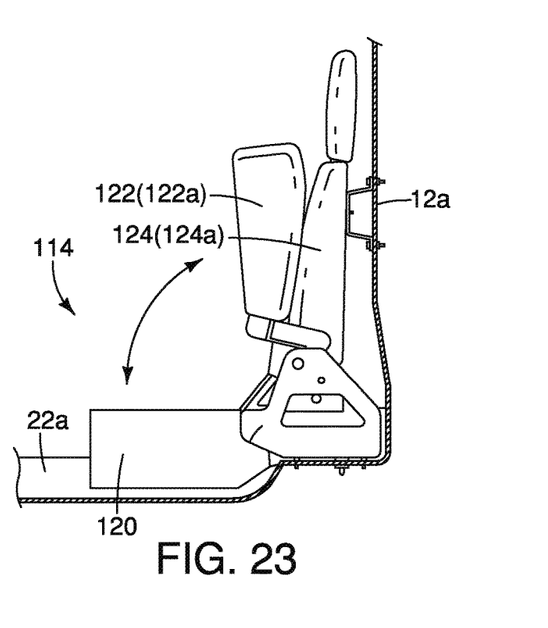
FIG. 23 is another side view the rear seat assembly with the seat cushion portion in a raised or open orientation exposing the base portion in accordance with the second embodiment.

The rear seat assembly 18 includes a base portion 120, seat portions 122 and 122a and upright seatback portions 124 and 124a. The base portion 120 includes a storage compartment 130. As shown in FIGS. 21-23, the upright seatback portion 124 and 124a are movable between a closed orientation covering the storage compartment 130 (shown in FIGS. 21 and 22) and an open orientation exposing the storage compartment 130 (shown in FIG. 23).

As shown in FIG. 21, the floor structure 22 includes a drive shaft tunnel 22a. Since drive shaft tunnels are conventional structures of rear wheel and four wheel drive vehicles, further description is omitted for the sake of brevity.

As shown in FIG. 24-27, the base portion 120 includes a front wall 128, side walls 132, a rear wall 134 and an optional bottom wall 136. The base portion 120 also includes a pair of removable partitions $P_1$ and $P_2$.

It should be understood from the drawings and the description herein that the base portion 120 can be a frame structure with an open bottom such that the floor structure 22 defines a bottom wall of the storage compartment 130. In the depicted embodiment, the base portion 120 includes the bottom wall 136.

Figure 24:
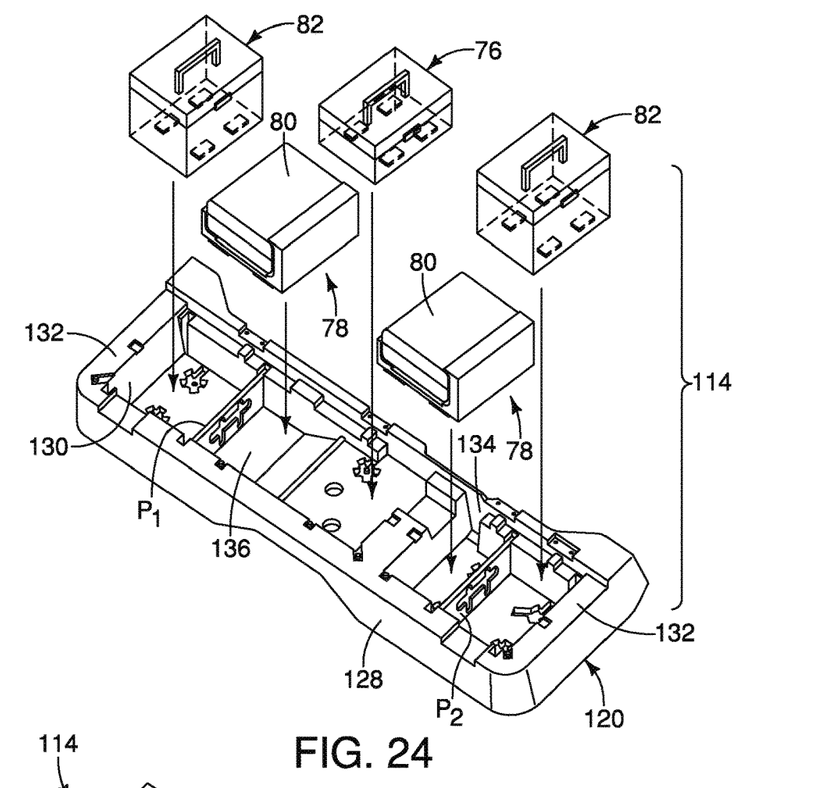
FIG. 24 is an exploded perspective view of the storage assembly showing a storage compartment within the base portion of the rear seat assembly, the storage compartment having at least two partitions, with two of the storage containers, one of the third storage boxes and two of the single box retaining structures with a respective single storage box retained therein ready for insertion into the storage compartment in accordance with the second embodiment.
Figure 25:
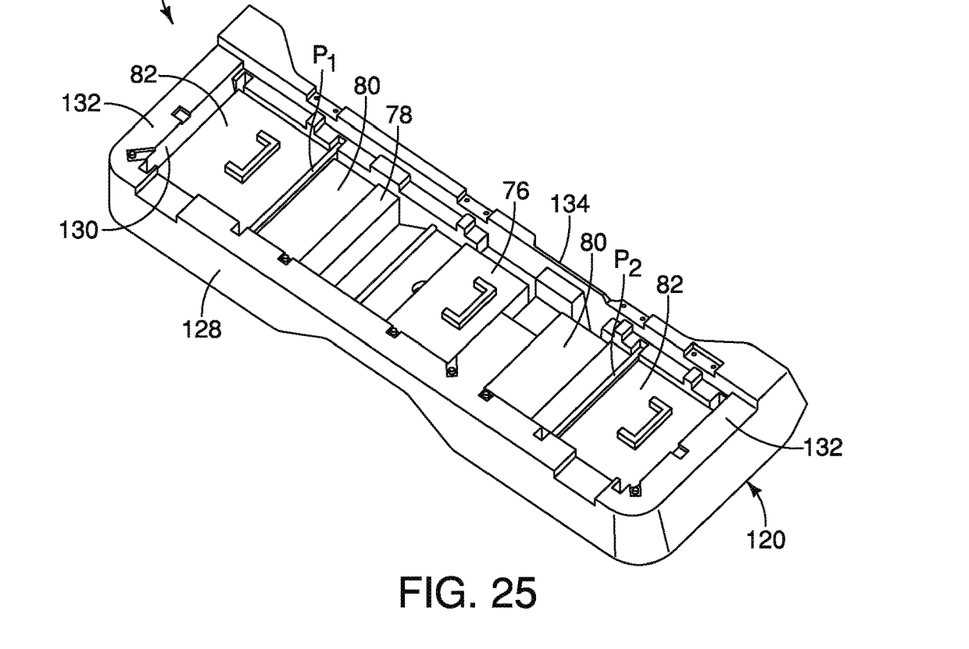
FIG. 25 is a perspective view of the storage assembly showing the storage compartment within the base portion with two of the storage containers, one of the third storage boxes and two of the single box retaining structures with the respective single storage box retained therein retained within the storage compartment in accordance with the second embodiment.

The front wall 128, the side walls 132, the rear wall 134 and the bottom wall 136 define the storage compartment 130. The seat portions 122 and 122a serve as lids that cover and conceal the storage compartment 130. With the removable partitions $P_1$ and $P_2$ installed within the storage compartment 130, as shown in FIGS. 24 and 25, there are at least five spaces for storage boxes and/or containers. Specifically, two of the storage containers 82, one of the third storage boxes 76 and two of the single box retaining structures 78 each with a respective single storage box 80 being removably retained therein.

Figure 26:
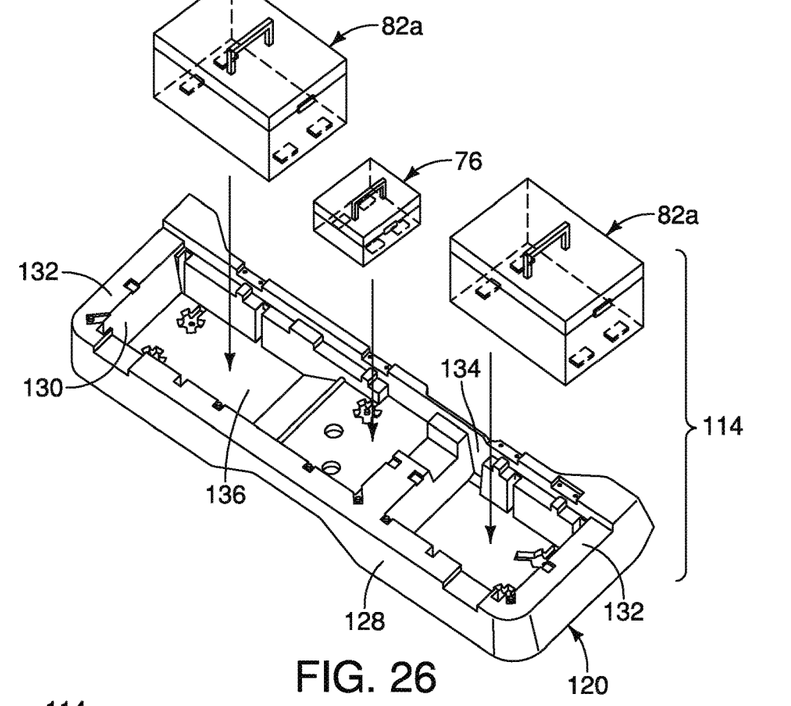
FIG. 26 is an exploded perspective view of the storage assembly showing the storage compartment within the base portion of the rear seat assembly with the two partitions removed from the storage compartment, with two large storage containers and one of the third storage boxes ready for insertion into the storage compartment in accordance with the second embodiment.
Figure 27:
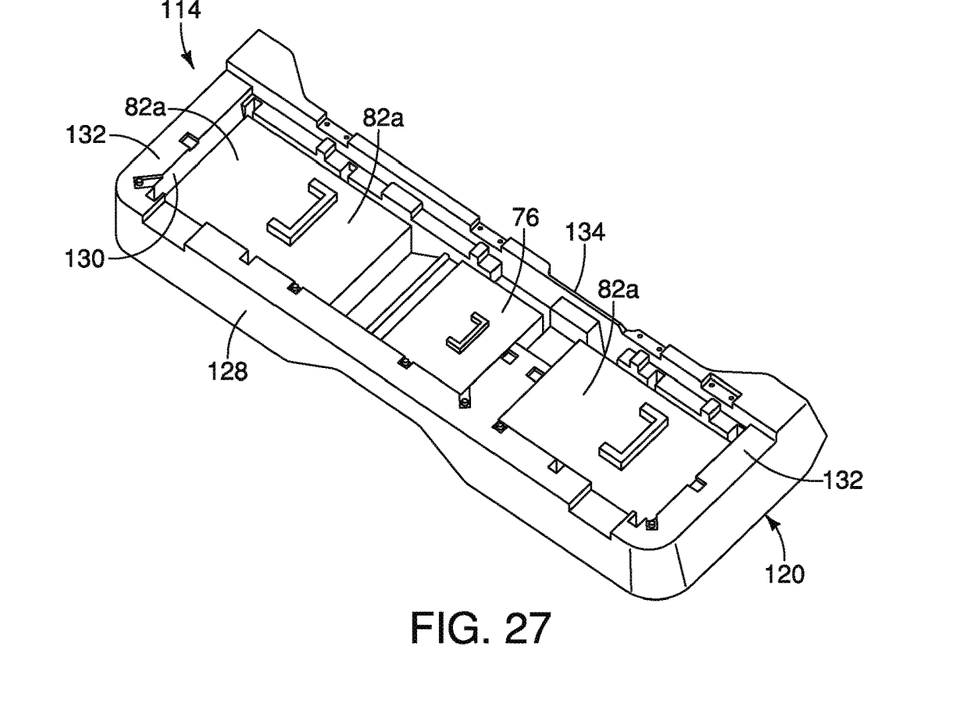
FIG. 27 is another perspective view of the storage assembly showing the storage compartment within the base portion of the rear seat assembly with the two partitions removed from the storage compartment, with the two large storage containers and the one of the third storage boxes inserted into the storage compartment in accordance with the second embodiment.

As shown in FIGS. 26 and 27, with the removable partitions P$_1$ and P$_2$ removed from the storage compartment 130 the size of the box that can be stored in the storage compartment 130 can be increased. In the depicted embodiment with the removable partitions P$_1$ and P$_2$, there are at least three large spaces for storage boxes and/or containers. Specifically, two of the large storage containers 82a, one of the third storage boxes 76 are removably retained within the storage compartment 130.

In the storage compartment 130, the storage boxes and/or storage containers removable placed therein have a side-by-side relationship and are not necessarily stacked. However, it should be understood from the drawings and the description herein that the storage boxes and/or storage containers placed in the storage compartment 130 can alternatively be stacked therein.

The various structural features of the vehicle 10, other than the storage assembly 14 and the storage assembly 114, are conventional components that are well known in the art. Since these structural features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section." "portion," "member" or "element" when used in the singular can have the dual meaning of a single part or a plurality of parts. Also as used herein to describe the above embodiment(s), the following directional terms "forward", "rearward", "above", "downward". "vertical", "horizontal", "below" and "transverse" as well as any other similar directional terms refer to those directions of a vehicle equipped with the passenger compartment storage assembly. Accordingly, these terms, as utilized to describe the present invention should be interpreted relative to a vehicle equipped with the passenger compartment storage assembly.

The term "configured" as used herein to describe a component, section or part of a device includes hardware that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A passenger compartment storage assembly, comprising:
    a storage structure fixed to a floor of a passenger compartment of a vehicle and having a storage compartment defined therein;
    a first storage box having a predetermined overall shape;
    a box retaining structure configured and dimensioned to releasably retain the first storage box, and
    a storage container, wherein
    the storage compartment is dimensioned and configured to receive the first storage box and the box retaining structure within the storage compartment, and the storage container has a predetermined overall shape such that the box retaining structure with the first storage box retained therein and the storage container are retained within the storage compartment of the storage structure with one on top of the other.

2. The passenger compartment storage assembly in accordance with claim 1, wherein
    the box retaining structure includes a bottom surface with alignment projections extending therefrom.

3. The passenger compartment storage assembly in accordance with claim 2, wherein
    the storage container includes an upper surface with alignment recesses formed therein such that the alignment projections of the box retaining structure are aligned with and fit into the alignment recesses with the box retaining structure resting atop the storage container.

4. A passenger compartment storage assembly comprising:
    a storage structure fixed to a floor of a passenger compartment of a vehicle and having a storage compartment defined therein;
    a first storage box having a predetermined overall shape;
    a box retaining structure configured and dimensioned to releasably retain the first storage box, wherein
    the storage compartment is dimensioned and configured to receive the first storage box and the box retaining structure within the storage compartment, the box retaining structure including a bottom surface with alignment projections extending therefrom.

5. A passenger compartment storage assembly comprising:
    a storage structure fixed to a floor of a passenger compartment of a vehicle and having a storage compartment defined therein;
    a first storage box having a predetermined overall shape; and
    a box retaining structure configured and dimensioned to releasably retain the first storage box, the box retaining structure including a base portion, an upright portion and an upper portion, the base portion having a first side and a second side, the upright portion extending from the first side of the base portion to the upper portion, the base portion, the upright portion and the upper portion being dimensioned and arranged such that an open area is defined between the upper portion and the second side of the base portion such that the first storage box is fitted through the open area and retained between the base portion and the upper portion, the storage compartment being dimensioned and configured to receive the first storage box and the box retaining structure within the storage compartment, the base portion of the box retaining structure further including a flexible and resilient strip of material that is compressed with the first storage box fitted to the box retaining structure thereby retaining the first storage box within the box retaining structure.

6. The passenger compartment storage assembly in accordance with claim 5, wherein
the box retaining structure is dimensioned and configured such that the first storage box and a plurality of second storage boxes are retained therein.

7. The passenger compartment storage assembly in accordance with claim 5, wherein
the box retaining structure is dimensioned and configured such that the first storage box and a plurality of second storage boxes are retained therein.

8. The passenger compartment storage assembly in accordance with claim 1, wherein
the box retaining structure includes a base portion, a first upright portion and a second upright portion, the base portion having a first side and a second side, the first upright portion extending upward from the first side of the base portion, and the second upright portion extending upward from the second side of the base portion, and
first and second upright portions being dimensioned and arranged such that an open area is defined between the first upright portion and the second upright portion such that the first storage box is fitted through the open area and retained along the base portion between the first upright portion and the second upright portion.

9. The passenger compartment storage assembly in accordance with claim 8, wherein
the box retaining structure is dimensioned and configured to retain only the first storage box therein.

10. The passenger compartment storage assembly in accordance with claim 1, wherein
the storage structure is a center console assembly attached to the floor of the passenger compartment.

11. A passenger compartment storage assembly, comprising
a storage structure fixed to a floor of a passenger compartment of a vehicle and having a storage compartment defined therein;
a first storage box having a predetermined overall shape;
a box retaining structure configured and dimensioned to releasably retain the first storage box, the storage compartment being dimensioned and configured to receive the first storage box and the box retaining structure within the storage compartment; and
another storage structure fixed to the floor of the passenger compartment beneath a seat cushion of a rear seat assembly.

12. The passenger compartment storage assembly in accordance with claim 11, wherein
the another storage structure is configured and dimensioned to releasably retain a plurality of the first storage boxes and at least a second storage box therein.

13. The passenger compartment storage assembly in accordance with claim 12, wherein
the another storage structure is configured and dimensioned to releasably retain the plurality of the first storage boxes and the at least a second storage box in a side-by-side relationship.

14. A passenger compartment storage assembly, comprising:
a storage structure fixed to a floor of a passenger compartment of a vehicle and having a storage compartment defined therein, the storage structure being fixed to the floor of the passenger compartment beneath a seat cushion of a seat assembly;
a first storage box having a predetermined overall shape;
a box retaining structure configured and dimensioned to releasably retain the first storage box, wherein
the storage compartment is dimensioned and configured to receive the first storage box and the box retaining structure within the storage compartment and the storage structure is configured and dimensioned to releasably retain a plurality of the first storage boxes and at least a second storage box therein.

15. The passenger compartment storage assembly in accordance with claim 14, wherein
the storage structure is configured and dimensioned to releasably retain the plurality of the first storage boxes and the at least a second storage box in a side-by-side relationship.

* * * * *